United States Patent [19]

Mast

[11] 3,903,273

[45] Sept. 2, 1975

[54] PARATHION CONTAINING LIQUID INSECTICIDAL CONCENTRATES

[75] Inventor: Roy Clark Mast, Cincinnati, Ohio

[73] Assignee: The Procter & Gamble Company, Cincinnati, Ohio

[22] Filed: July 6, 1973

[21] Appl. No.: 377,005

[52] U.S. Cl. ............... 424/218; 424/200; 424/213; 424/225; 424/341
[51] Int. Cl.² ............................................ A01N 9/36
[58] Field of Search .......... 424/200, 218, 213, 225, 424/341

[56] References Cited
UNITED STATES PATENTS

| | | | |
|---|---|---|---|
| 2,898,267 | 8/1959 | Lindner | 424/342 X |
| 3,071,550 | 1/1963 | Altscher et al. | 252/354 |
| 3,124,602 | 3/1964 | Altscher et al. | 424/213 X |
| 3,155,568 | 11/1964 | Surgant et al. | 424/213 X |
| 3,652,740 | 3/1972 | Schrader et al. | 424/216 X |

OTHER PUBLICATIONS

Chemical Abstracts, 67:107620n, (1967).
Chemical Abstracts, 53:14405h, (1959).

Primary Examiner—Albert T. Meyers
Assistant Examiner—Leonard Schenkman
Attorney, Agent, or Firm—Jack D. Schaeffer; William Keith Turner; John B. Goodman

[57] ABSTRACT

Concentrated liquid pesticidal compositions comprising well-defined amounts of a sparingly water-soluble organophosphate pesticide and, as an emulsifying agent, a specific polyoxyethylene derivative of octylphenol.

1 Claim, No Drawings

PARATHION CONTAINING LIQUID INSECTICIDAL CONCENTRATES

BACKGROUND OF THE INVENTION

This invention relates to concentrated liquid pesticidal compositions, which, when diluted by water, form optically clear, homogeneous, stable emulsions. The concentrates detailed herein comprise, in general, an organophosphate pesticide or mixtures of pesticides, and octylphenol ethoxylate having an average of nine ethoxylate groups.

Current needs for inherently safer pesticides which rapidly degrade into non-toxic substances once their purpose has been accomplished, or alternatively may be utilized as lower levels, have focused interest on the use of pesticidal emulsions. In order to facilitate the preparation of emulsions, many pesticides are marketed in the form of emulsifiable concentrates typically comprising a pesticide, an emulsifier (surfactant), and an organic water-insoluble fuidizer.

The use of nonionic surfactants as emulsifiers in such concentrates is well known by those skilled in the art. Such emulsifying agents are, generally speaking, reasonably effective in particular formulations and under particular conditions. However, they suffer certain shortcomings.

Typical concentrates when diluted have a characteristic cloudy or milky appearance because the droplets of the discontinuous (oil) phase are normally of the order of 1 to 25 microns in diameter. Due to the relatively large droplet size in such emulsions, there is a tendency for the organic materials to coalesce upon standing to form separate phase layers. In addition, many of the previously known concentrate compositions which dilute to transparent emulsions require either co-surfactants or fluidizers to promote solubilization of the pesticide. Consequently, the cost of many presently available pesticidal concentrates depends upon the combined cost of a number of components. Finally, many previously available concentrates will not form emulsions in the presence of calcium or magnesium ions, i.e., cannot be formulated using "hard" water as the diluent.

In contrast, it has been discovered that liquid pesticidal concentrates comprising an organophosphate pesticide, or mixture of pesticides, and a specific octylphenol surfactant, can be prepared which will form optically clear, homogeneous, stable emulsions when diluted by "hard" or "soft" water. It is believed that the enhanced stability of the instant emulsions, as well as the clarity, is due to the solubilization of the organophosphate in micellar structures. Apparently, the organic material is solubilized in micelles with a diameter on the order of $10^{-1}$ to $10^{-3}$ microns. A micellar structure can be described as a colloidal aggregation of molecules, each molecule being generally characterized by a polar "head" and a hydrocarbon "tail." When in an aqueous media, the hydrocarbon portions of each molecule uniformly associate at the interior of the structure, and the polar portions at the exterior.

Moreover, the instant surfactant surprisingly enhances the wetting and spreading properties of emulsions thus providing for more efficient use of pesticide. Recent ecological concerns have underscored the significance of reduced quantities of pesticides in the environment, thereby emphasizing the importance of improved efficiency in the use of pesticides.

Other concentrate compositions containing a single nonionic surfactant are known in the art. U.S. Pat. No. 3,287,103 discloses the use of nonionic surfactants of the formula R $(R'O)_{x+y}$H, wherein R is a hydrophobic radical, for example, alkyl or alkylphenol and $(R'O)_{x+y}$ is oxyalkylene, for example, ethoxylate, in combination with organotin compounds to form concentrated pesticidal compositions. It is known that the ability of surfactants to solubilize even closely related materials is not predictable. Accordingly, it has been discovered that organophosphate pesticides cannot be solubilized with any broad class of nonionic surfactants. On the contrary, it has been unexpectedly discovered that organophosphate compounds will form pesticidal concentrate compositions only when solubilized in the specific surfactant prepared by condensing 1 mole of octylphenol with about 9 moles ethylene oxide.

Accordingly, it is the principal object of the present invention to provide improved liquid, pesticidal concentrates containing an organophosphate pesticide which will form optically clear, homogeneous, and stable emulsions when diluted by water. This and other objects are achieved by the present invention in accordance with the forthcoming disclosure.

SUMMARY OF THE INVENTION

The present invention encompasses liquid pesticidal concentrates which may be readily diluted over a wide range of concentrations to form optically clear, homogeneous, and stable emulsions, comprising (1) from about 5 to about 25% by weight of a sparingly water-soluble organophosphate; and (2) from about 60 to 95% by weight of a nonionic surfactant prepared by condensing octylphenol with ethylene oxide to an average of about 9 ethoxylate groups.

DETAILED DESCRIPTION OF THE INVENTION

Objects of the present invention are achieved by providing liquid pesticidal concentrates containing as essential ingredients 1. from about 5 to about 25%, preferably from about 15 to about 20%, by weight of a sparingly water-soluble organophosphate pesticide. As used herein, the term "sparingly water-soluble" means having a solubility in water of less than about 0.1% by weight at 25°C.

A wide variety of organophosphate pesticides are known to the art. However, this class of pesticide is typically characterized by the moiety

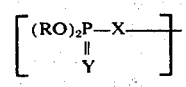

wherein R is straight or branched chain alkyl containing from 1 to about 5 carbon atoms, and X and Y are either oxygen or sulfur, which is esterified with a large variety of organic groups. For purposes of the present invention, the selection of a suitable organophosphate pesticide is a matter of choice by the practitioner. Suitable organophosphate pesticides may be in either solid or liquid form. Organophosphates in liquid form may be directly incorporated into the concentrate compositions herein detailed. Such liquid compounds typically comprise up to about 20% by weight of the composition. Organophosphates in solid form can be incorporated into the present concentrate compositions by initially dissolving the solid compound in a suitable solvent such as N-methyl pyrrollidone, acetone, methylethyl ketone, etc., and subsequently treating the resulting mixed liquid as the pesticidal component. In such a manner, solid compounds can comprise up to about 15% by weight of the concentrate composition. There are a few solid organophosphate pesticides which cannot be incorporated in the present concentrates even when dissolved in a solvent. However, it has been discovered that some of these unique solids can be incorporated by first dissolving them in a solution of a liquid organophosphate and a suitable solvent, and subsequently thoroughly mixing the resulting solution with the ethoxylated octylphenol emulsifier. In such a manner, these unique solids can comprise up to about 5% by weight of the concentrate composition, and provide a total organophosphate concentration up to about 20% by weight. Solid organophosphates which do not dissolve to at least 25% in common solvents cannot be incorporated into the present systems. Although the organophosphate compounds suitable for use herein have been found useful for a variety of purposes, it is known that such compounds are characteristically toxic. Primarily noted as insecticides, the organophosphates useful herein are also known to be acaricides, miticides, fungicides, viricides, and herbicides. Thus, the liquid concentrates disclosed herein are of particular interest as pesticidal concentrates. Various non-limiting examples of organophosphate pesticides suitable for use herein include parathion, methylparathion, malathion, Guthion, ronnel, trichloronate, bromophus, famphur, dioxathion, diazinon, amidithion, azinphos-ethyl, bis-OO-di (N-propyl)-phosphorothionic anhydride, and carbophenothion.

Methyl-parathion, parathion, diazinon, malathion, Guthion (solid), ronnel (solid) and mixtures thereof are preferred for use in the concentrates herein disclosed due to the unexpected and significant enhancement in activity which is obtained when these insecticides are applied in clear emulsion form.

2. From about 60 to about 95%, preferably from about 70 to about 85%, by weight of a nonionic surfactant produced by condensing 1 mole of octylphenol with an average of about 9 moles of ethylene oxide. The resulting surfactant is commercially available under a variety of tradenames and from a variety of manufacturers. For instance, octylphenol ethoxylates are marketed by GAF Corporation as the Igepal CA series and by Rohm & Haas Co. as the Triton-X series. The specific surfactants employed herein are marketed as Igepal CA 630 and Triton X-100, i.e., octylphenol ethoxylate having an average of about 9 ethoxylate groups per octylphenol group. It has been discovered that these specific surfactants are uniquely and unexpectedly capable of solubilizing the organophosphate pesticides described above to form concentrated compositions which form clear, stable, homogeneous emulsions when diluted by water.

In order to obtain the concentrates disclosed herein, it is essential that the organophosphate pesticides and the surfactant (emulsifier) be present in certain proportions. Specifically, the instant concentrates comprise from about 5 to about 25% by weight of a sparingly water-soluble organophosphate pesticide and from about 60 to about 95% by weight of ethoxylated octylphenol emulsifier.

Due to the fact that the organophosphates suitable for use herein are of different chemical and physical types, the proportion of components suitable for achieving a concentrate of one compound may not be the same as for another. No steadfast rules are known whereby prediction of precise proportions needed can be made. Some empirical testing may be required, therefore, in order to select the necessary proportions of components for obtaining a liquid concentrate of a particular compound. Such empirical testing is well within the skill of those engaged in the emulsion art.

As noted previously, a special circumstance arises when the organophosphate compound does not dissolve in the emulsifier. This can occur particularly in the case of many solid compounds. In such cases, one must proceed by first dissolving the solid compound in a suitable solvent (or in some cases a solution of a solvent and a liquid organophosphate) and subsequently treating the resulting liquid mixture as if it were the intended compound.

The pesticidal concentrates herein are most easily formulated when starting with pure, or at least "technical grade" compound since this reduces the number of extraneous (and in most cases unknown) materials which are introduced into the formulation and which can adversely affect the ease with which a concentrate can be attained. Therefore, the use of organophosphates having a purity of at least "technical grade" is preferred herein.

The following examples are given by way of illustration and are in no way to be construed as limitations on the invention claimed herein.

The following table sets forth concentrate compositions employing a variety of representative liquid organophosphate compounds with ethoxylated octylphenol. The concentrates, when diluted to use level concentrations of from about 0.01 to about 2.5% organophosphate with water, form clear, micellar, physically stable emulsions, which when applied to insects in the conventional manner, showed significant biocidal activity.

TABLE I

LIQUID ORGANOPHOSPHATES
Concentrate Ingredients, % by Weight

| Ex. | Organophosphate | Organophosphate | Emulsifier | Other* |
|---|---|---|---|---|
| I | Parathion | 20.0 | 80.0 | 0.0 |
| II | Methyl-parathion | 15.0 | 81.2 | 3.8 |
| III | Malathion | 20.0 | 80.0 | 0.0 |
| IV | Diazinon | 20.0 | 77.0 | 3.0 |

*In all examples, "Other" refers to impurities and other solvents in some of the organophosphates.

Equivalent amounts of the following liquid organophosphates are substituted in the above compositions: fenthion, and mecarbam, with comparable results.

The following example is intended to demonstrate the use of a solvent to dissolve a solid organophosphate prior to incorporation into the octylphenol ethoxylate emulsifier. The system was formed by dissolving the necessary quantity of organophosphate compound in N-methyl-pyrrolidone (NMP), then mixing this solution thoroughly with the emulsifier. The resulting concentrate, when diluted to use level concentrations of from about 0.01 to about 2.5% organophosphate by water, form clear, micellar, physically stable emulsions, which when applied to insects in the conventional manner, showed significant biocidal activity.

EXAMPLE V

| Component | % by Weight |
| --- | --- |
| Ronnel | 10.0 |
| NMP | 15.0 |
| Ethoxylated Octylphenol | 72.5 |
| Other | 2.5 |

Equivalent amounts of the following solvents may be substituted for NMP in the above composition: dimethylformamide, dimethylacetamide, dimethylsulfoxide, acetone, and methylethyl ketone, with comparable results.

The following table is intended to demonstrate the variety of fluid concentrates which have been formed from mixtures of organophosphates incorporated into the octylphenol ethoxylate emulsifier. If one of the insecticides were solid, it was dissolved in a suitable solvent before mixing. The resulting concentrates, when diluted to use level concentrations of from about 0.01 to about 2.5% organophosphate by water, form clear, micellar, physically stable emulsions, which when applied to insects in the conventional manner, showed significant biocidal activity.

TABLE III

ORGANOPHOSPHATE MIXTURES
Concentrate Ingredients, % by Weight

| Ex. | Organophosphate | Organo-phosphate | Emulsifier | NMP | Other |
| --- | --- | --- | --- | --- | --- |
| VI | Diazinon | 10.0 | 82.5 | | 2.7 |
| | Methyl-parathion | 4.8 | | | |
| VII | Diazinon | 10.1 | 79.0 | | 1.7 |
| | Parathion | 9.2 | | | |
| VIII | Guthion (solid) | 4.8 | 66.4 | 11.6 | 2.5 |
| | Diazinon | 14.7 | | | |

The concentrates described herein are conveniently applied as a dilute pesticidal emulsion in the form of a spray, foam or aerosol just as in the case of conventional concentrates. Other means such as immersion, drenching, etc. can also be used if desired. Accordingly, the present invention encompasses a method of preparing a clear stable pesticidal composition comprising co-dissolving in an aqueous media a sparingly water-soluble organophosphate pesticide and the condensation product of 1 mole of octylphenol with about 9 moles of ethylene oxide. Accordingly, the present development also encompasses methods for using the toxic concentrates, hereinabove, by diluting the concentrates to use level emulsions; and contacting the pest to be controlled with a safe and effective amount of said emulsion.

The term "contacting" is intended to include direct application to the pest as well as application to habitat or vicinity. Thus, in the case of herbicidal emulsions, contact includes, for example, contacting the plant itself as well as the soil; and in the case of insecticidal emulsions, contact includes, for example, contacting the pest, its habitat, or its food.

Although the concentrates discussed above can be readily diluted over a wide range of concentrations dependent primarily upon the nature of the pesticide, the degree of infestation, and the choice of the user, it has been determined that for maximum efficacy use level dilution is normally from about 0.01 to about 2.5% by weight organophosphate. (Unless indicated otherwise, use level concentrations are in percentage by weight of pesticide per total use level weight of the emulsions.) When applied broadcast, within these normal ranges of dilution, the emulsions which result from dilution are unusually effective at rates of from about ⅛ pound per acre to about 20 pounds per acre. For insecticidal emulsions, the preferred rates of application, assuming normal dilution, are from about ⅛ pound per acre to about 5 pounds per acre. For herbicidal emulsions the preferred rates of application, again assuming normal dilution, are from about ½ pound per acre to about 10 pounds per acre.

What is claimed is:

1. A liquid concentrated composition, comprising: (1) about 15% by weight of parathion, and (2) about 85% by weight the condensation product of 1 mole of octylphenol with about 9 moles of ethylene oxide.

* * * * *